Figure 1:
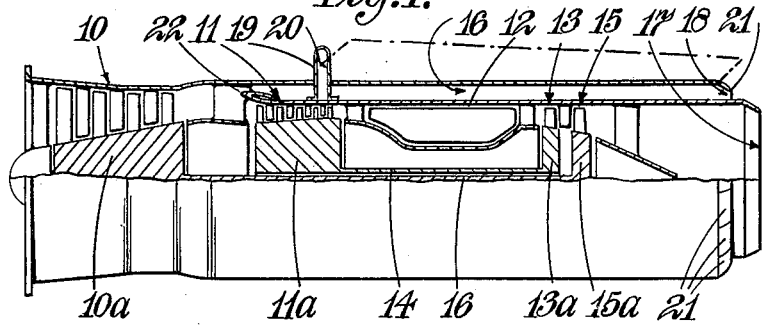

Oct. 29, 1963    E. ELTIS ETAL    3,108,767
BY-PASS GAS TURBINE ENGINE WITH AIR BLEED MEANS
Filed March 9, 1961    2 Sheets-Sheet 1

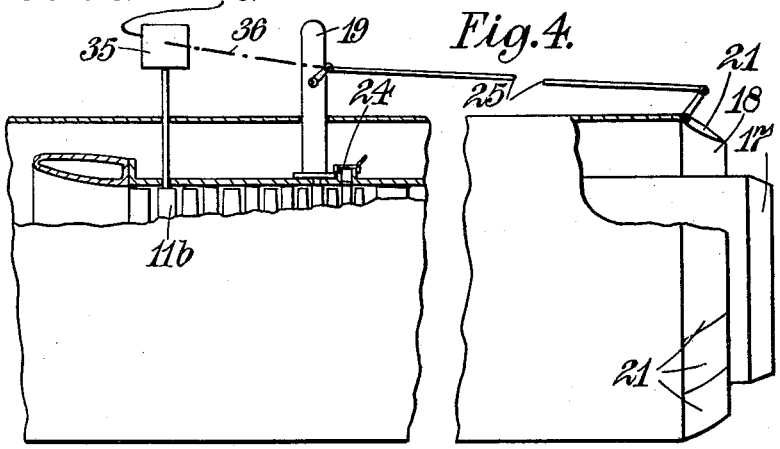
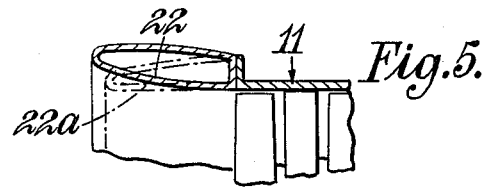
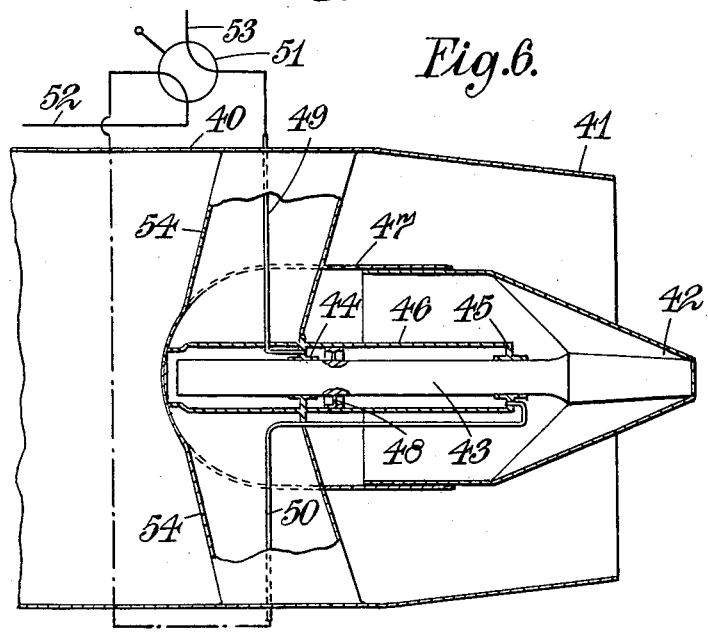

United States Patent Office 3,108,767
Patented Oct. 29, 1963

3,108,767
BY-PASS GAS TURBINE ENGINE WITH AIR BLEED MEANS
Ernest Eltis, Windley, and Alec Graham Collins, Weston-on-Trent, England, assignors to Rolls-Royce Limited, Derby, England, a British company
Filed Mar. 9, 1961, Ser. No. 94,566
Claims priority, application Great Britain Mar. 14, 1960
9 Claims. (Cl. 244—42)

This invention comprises improvements in or relating to gas turbine engines of the by-pass kind (referred to herein as by-pass engines) in which compressed air from a compressor of the engine is divided into first and second streams, whereof the first stream is passed through a high-pressure compressor, a heater, for instance combustion equipment, and a turbine to an exhaust assembly, and the second stream is conveyed by a by-pass duct to the exhaust assembly without passing through the heater and turbine. The exhaust assembly may comprise either separate outlet nozzles for the exhaust gases from the turbine and the by-pass air, or a single outlet nozzle, the by-pass air being delivered into the exhaust gases upstream of the nozzle.

In some uses of gas turbine engines, it is convenient to bleed off air from the compressor system for auxiliary purposes, as distinct from bleeding air to improve the compressor operation at rotational speeds other than the design speed, and this invention is concerned with by-pass engines from which air is to be bled for auxiliary purposes.

According to the present invention, a by-pass engine has means to bleed compressed air from the engine downstream of the low-pressure compressor including a valve controlling the bleed flow, the high-pressure compressor is designed so that at maximum rotational speed and maximum bleed the high-pressure compressor is not caused to choke, and means is provided to vary the flow in the by-pass duct to maintain the inlet pressure of the high-pressure compressor as the bleed flow is varied.

Preferably the air is bled from the high-pressure compressor but it can, alternatively, be bled from any other point downstream of the low-pressure compressor. Thus the air can be bled from the low-pressure compressor outlet, the by-pass duct, any point along the high-pressure compressor, or the high-pressure compressor outlet.

The means to vary the flow in the by-pass duct may comprise valving at the downstream end of the duct, such valving being coupled to the valve controlling the bleed flow so that, as the bleed flow is increased, the outlet area of the by-pass duct is decreased.

In some arrangements, choking of the high-pressure compressor may be avoided at maximum speed and maximum bleed flow by giving the high-pressure compressor a larger intake area than would otherwise be required.

In some arrangements, it may also be desirable to provide variable stagger stator blades in the earlier stages of the high-pressure compressor in order to improve compressor operation at low rotational speeds, and in such a case the stator blades will be controlled by a speed-responsive mechanism which is rendered operative on opening of the bleed valve.

An important application is in aircraft having blown flaps, the flaps being operated by the air bled from the high-pressure compressor. The quantity of air required for operation of the flaps is large and, by the arrangement of the invention, the required quantity of bleed air may be obtained without materially reducing the mass flow of air from the high-pressure compressor to the heater. Also the thrust losses will not be excessive since the thrust loss from the engine is largely recovered at the blown flaps.

Figure 2:
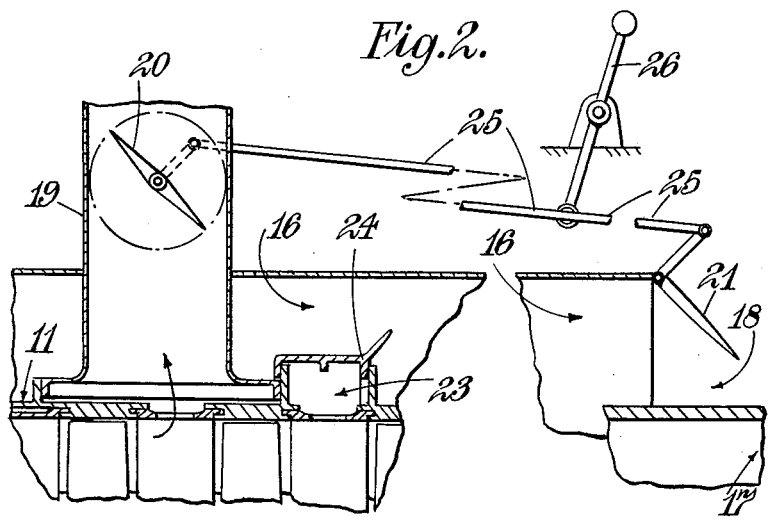
Figure 3:
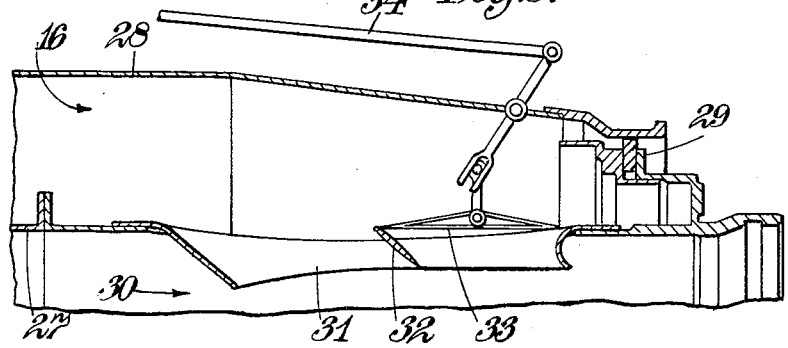

Some embodiments of this invention will now be described by way of example with reference to the accompanying drawings, in which:

FIGURE 1 illustrates a by-pass engine in accordance with this invention, parts being in section,
FIGURE 2 illustrates a modification in section,
FIGURE 3 illustrates another modification,
FIGURE 4 illustrates another form of the invention applied to the by-pass engine,
FIGURE 5 illustrates a detail of a high-pressure compressor of a by-pass engine employed in the construction of engine illustrated in FIGURES 1 and 4, and
FIGURE 6 shows another modification.

The by-pass engine illustrated in FIGURE 1 comprises a low-pressure compressor 10, a high-pressure compressor 11, a heater 12, shows as combustion equipment, a high-pressure turbine 13 whereof the rotor 13a is connected by a hollow shaft 14 to drive the rotor 11a of the high-pressure compressor and a low-pressure turbine 15 whereof the rotor 15a is connected by a shaft 16 to drive the rotor 10a of the low-pressure compressor 10. The shaft 16 extends coaxially through a high-pressure rotor assembly comprising the high-pressure compressor rotor 11a of the shaft 14 and the high-pressure turbine rotor 13a. The engine also comprises a by-pass duct 16, the entry end of which is open to the outlet end of the low-pressure compressor 10 so that a first stream of the air compressed in the low-pressure compressor 10 flows into the high-pressure compressor 11 and a second stream of the air compressed in the low-pressure compressor 10 flows into the by-pass duct 16.

The engine also comprises an exhaust assembly having a central nozzle 17 through which the exhaust gases from the turbines 13, 15 pass to atmosphere as a propulsive jet, and an annular nozzle outlet 18 at the downstream end of the by-pass duct 16.

The engine illustrated is suitable for aircraft propulsion purposes and means are provided for tapping-off substantial quantities of air from the high-pressure compressor 11, which air is used for auxiliary purposes in the aircraft. For example the air may be used for the operation of blown flaps.

This means comprises a tapping duct 19 which is open at one end to the working fluid passage through the high-pressure compressor, and the duct 19 is shown as opening into the high-pressure compressor 11 adjacent its high-pressure, or outlet, end. The duct is fitted with a valve 20 for controlling the amount of air tapped off from the compressor 11.

If such tapping were to be effected without modification of the engine, the efficiency of the engine would be greatly reduced and accordingly in the engine illustrated there is provided means by which the pressure at the inlet end of the high-pressure compressor 11 can be maintained, and the high-pressure compressor is designed so that, when the compressor is running at its maximum rotational speed and when the valve 20 is fully open so that the bleed flow is a maximum, the high-pressure compressor 11 will not choke.

In the arrangement shown the by-pass duct 16 is provided at its nozzle outlet 18 with a series of pivoted flaps 21 which on adjustment vary the area of the nozzle outlet 18 and these flaps are coupled for operation to the valve 20 so that as the valve 20 is opened the flaps 21 are adjusted to reduce the area of the nozzle outlet 18 in a manner to maintain the desired inlet pressure of the high-pressure compressor 11. Also the effective area of the entry of the high-pressure compressor is made larger than would otherwise be necessary. For example, as illustrated in FIGURE 5 the outer wall 22 of the entry to the high-pressure compressor 11 may be shaped as shown in full lines rather than having an entry as shown at 22a in dotted lines which represents a normal form of entry to the high-pressure compressor of a by-pass engine.

With such an arrangement the mass flow of air from the high-pressure compressor 11 into the combustion equipment 12 is not materially reduced during air bleeding operations. Also when the duct 19 is connected to supply air to blown flaps the loss of thrust is small, since there is a substantial recovery of thrust at the blown flaps.

FIGURE 2 shows part of the high-pressure compressor and of the exhaust assembly of another form of engine in which in addition to providing a bleed duct 19 for auxiliary purposes, there is provided bleed means for improving the handling characteristics of the engine at rotational speeds other than the design rotational speed. The handling bleed means comprises a chamber 23 which is in communication with the working fluid passage of the high-pressure compressor 11 and has a valve 24 controlling the bleed flow from the high-pressure compressor through the chamber 23 into the duct 16. Normally the valve 24 will be closed when bleeding of air is being effected through the duct 19.

In this figure the bleed control valve 20 and the pivoted flaps 21 are shown as coupled by a linkage 25 to a control lever 26 so that as valve 20 opens the flaps 21 are adjusted to reduce the area of the nozzle outlet 18 from the by-pass duct 16.

FIGURE 3 illustrates how the outlet area of the by-pass duct 16 can be varied when the by-pass air is mixed with exhaust gases prior to exit to atmosphere. The by-pass duct is defined between an internal wall structure 27 and an outer wall structure 28 and at the downstream end the space between the walls is blanked off by seal structure 29. The wall structure 27 also forms the external boundary of the exhaust gas passage 30 and the wall structure 27 is provided with a ring of stub pipes 31 which provide outlets from the down-stream end of the by-pass duct 16 into the exhaust passage 30. Each stub pipe 31 is divided into two by a streamlined vane 32 and a pivoted flap 33 is mounted in the by-pass duct adjacent the stub pipes to swing from a closed position as shown, in which the flap closes off the flow path from the duct through the portion of the stub pipe downstream of the streamlined vane 32 and a position in which this portion of the pipe is open. Clearly by adjusting the position of the flap 33 the effective outlet area of each stub pipe 31 is varied and it will be arranged that as the bleed valve 20 is opened so the flaps 33 are adjusted to reduce the effective area of the stub pipes 31. A linkage 34 is shown for moving the flaps 33, and this linkage is preferably connected to be operated simultaneously with the valve 20.

FIGURE 4 illustrates an arrangement which is similar to that of FIGURE 2 and the same reference numerals are used in FIGURE 4 as in FIGURE 2 to indicate like parts. In this arrangement, however, there is additionally provided means to cater for low speed conditions when a large bleed flow is required. In this arrangement the first stage or earlier stages of the stator blades of the high-pressure compressor 11 are made adjustable in stagger and the adjustment of the blades is controlled by a speed-responsive device which is rendered operative and inoperative by opening and closing adjustment of the bleed valve 20. For instance as shown, the first stage stator blades 11b are made adjustable in stagger the adjustment being under control of a speed-responsive device 35 which is rendered operative and inoperative by a connection 36 to the linkage 25 coupling the bleed valve 20 with the flaps 21.

Instead of the arrangement of FIGURE 3 for maintaining the pressure at the intake of the high-pressure compressor, the valving may be in the form of a variable area nozzle at the outlet of the exhaust assembly through which the mixed exhaust gases and by-pass air flow to atmosphere. Such an arrangement is shown in FIGURE 6, wherein the exhaust pipe 40 leads to a variable-area nozzle of the annular kind formed between a convergent fixed wall 41 and a retractable central bullet 42.

The bullet 42 is provided with a hollow, axially elongated member 43 which is supported by two axially spaced apart bearings 44, 45 provided internally of a tube 46 forming part of a fixed bullet housing 47 supported by struts 54 extending from the exhaust pipe 40.

A piston like flange 48 is formed on the member 43 in a position where it will be disposed between the bearings 44, 45 and is a sliding fit within the tube 46, whereby the space between the bearings is divided into two chambers. Thus when pressure fluid is applied to one side of the flange 48 the bullet 42 is caused to move axially in one direction, and when pressure fluid is applied to the other side of the flange, the bullet is caused to move axially in the other direction, whereby the outlet area of the nozzle can be varied.

Air supply pipes 49, 50 are arranged to supply air from the engine to each side of the flange 48, through the bearings 44, 45 both pipes being connected to a valve 51 which has a pipe 52 leading to a supply of air from the engine and a pipe 53 leading to atmosphere.

Porting is provided in the valve 51 which is arranged so that when pressure air is supplied to one side of the flange 48 on the other side thereof will be vented to atmosphere.

As the outlet area of the nozzle is varied so the pressure in the jet pipe is varied and this is reflected by a corresponding change in pressure at the inlet to the high pressure compressor.

The operation of the valve 51 will be controlled in accordance with the rate of air bleed to maintain the desired inlet pressure to the high pressure compressor.

We claim:

1. A by-pass gas turbine engine comprising
   (a) a low-pressure air compressor,
   (b) a high-pressure air compressor receiving compressed air from the low-pressure compressor,
   (c) combustion equipment in which compressed air from the high pressure compressor is heated,
   (d) a high-pressure turbine,
   (e) a low-pressure turbine, said compressors, said combustion equipment and said turbines being connected in flow series arrangement, said low pressure turbine driving the low-pressure compressor and said high-pressure turbine driving said high-pressure compresor,
   (f) a by-pass air duct having an inlet thereto connected to said flow series arrangement between said compressors to receive air compressed in the low-pressure compressor,
   (g) an exhaust nozzle assembly, said low-pressure turbine and said by-pass duct delivering to said exhaust nozzle assembly,
   (h) bleed ducting connected to said flow series arrangement and abstracting air therefrom, said bleed ducting delivering abstracted air externally of the engine,
   (i) a valve in said bleed ducting varying the rate of abstraction of air through the bleed ducting,
   (j) means varying the air flow in said by-pass air duct and maintaining the pressure of the compressed air received by the high-pressure compressor on variation of the flow of abstracted air in said bleed ducting, whereby said high-pressure compressor is unchoked at its maximum rotational speed and at maximum rate of abstraction of air through said bleed ducting.

2. A by-pass engine according to claim 1, said high-pressure compressor having a working fluid passage, and said bleed ducting having an inlet thereto connected to said working fluid passage.

3. A by-pass gas turbine engine comprising
(a) a low-pressure air compressor,
(b) a high-pressure air compressor receiving compressed air from the low-pressure compressor,
(c) combustion equipment in which compressed air from the high pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressor to receive air compressed in the low-pressure compressor,
(g) an exhaust nozzle assembly, said low-pressure turbine and said by-pass duct delivering to said exhaust nozzle assembly,
(h) bleed ducting connected to said flow series arrangement and abstracting air therefrom, said bleed ducting delivering abstracted air externally of the engine,
(i) a valve in said bleed ducting varying the rate of abstraction of air through the bleed ducting,
(j) means varying the air flow in said by-pass duct comprising valving at the downstream end of the by-pass duct, said valving being coupled for operation to the valve in the bleed ducting in the sense that, as the valve in the bleed ducting is opened, the valving is closed so that the outlet area of the by-pass duct is decreased, said means maintaining the pressure of the compressed air received by the high-pressure compressor on variation of the flow of abstracted air in said bleed ducting, whereby said high-pressure compressor is unchoked at its maximum rotational speed and at maximum rate of abstraction of air through said bleed ducting.

4. A by-pass gas turbine engine comprising
(a) a low-pressure air compressor,
(b) a high-pressure air compressor receiving compressed air from the low-pressure compressor,
(c) combustion equipment in which compressed air from the high-pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressors to receive air compressed in the low-pressure compressor,
(g) bleed ducting connected to said flow series arrangement and abstracting air therefrom, said bleed ducting delivering abstracted air externally of the engine,
(h) a valve in said bleed ducting varying the rate of abstraction of air through the bleed ducting.
(j) means varying the air flow in said by-pass duct comprising valving at the downstream end of the by-pass duct, said valving being coupled for operation to the valve in the bleed ducting in the sense that, as the valve in the bleed ducting is opened, the valving is closed so that the outlet area of the by-pass duct is decreased, said means maintaining the pressure of the compressed air received by the high-pressure compressor on variation of the flow of abstracted air in said bleed ductings, whereby said high-pressure compressor is unchoked at its maximum rotational speed and at maximum rate of abstraction of air through said bleed ducting, and
(j) an exhaust nozzle assembly, comprising an air outlet nozzle at the downstream end of the by-pass duct, said nozzle opening to atmosphere and said valving comprising flaps at the outlet nozzle to vary its area.

5. A by-pass gas turbine engine comprising
(a) a low-pressure air compressor,
(b) a high-pressure air compressor receiving compressed air from the low-pressure compressor,
(c) combustion equipment in which compressed air from the high-pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressors to receive air compressed in the low-pressure compressor,
(g) an exhaust nozzle assembly comprising an exhaust nozzle assembly comprising an exhaust duct leading from said low-pressure turbine, and stub delivery pipes connected to the downstream end of the by-pass duct and opening into the exhaust duct,
(h) bleed ducting connected to said flow series arrangement and abstracting air therefrom, said bleed ducting delivering abstracted air externally of the engine,
(i) a valve in said bleed ducting varying the rate of abstraction of air through the bleed ducting,
(j) means varying the air flow in said by-pass duct comprising valving at the downstream end of the by-pass duct, said valving being coupled for operation to the valve in the bleed ducting in the sense that, as the valve in the bleed ducting is opened, the valving is closed so that the outlet area of the by-pass duct is decreased, said means maintaining the pressure of the compressed air received by the high-pressure compressor on variation of the flow of abstracted air in said bleed ductings, whereby said high-pressure compressor is unchoked at its maximum rotational speed and at maximum rate of abstraction of air through said bleed ducting, said valving co-operating with the stub pipes to vary their effective flow area.

6. A by-pass gas turbine engine comprising
(a) a low-pressure air compressor,
(b) a high-pressure air compressor receiving compressed air from the low-pressure compressor,
(c) combustion equipment in which compressed air from the high-pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressors to receive air compressed in the low-pressure compressor,
(g) an exhaust nozzle assembly comprising an exhaust duct leading from said low-pressure turbine, the downstream end of the by-pass duct opening into the exhaust duct, an exhaust nozzle at the downstream end of the exhaust duct, the exhaust nozzle including a fixed annular outer wall,
(h) bleed ducting connected to said flow series arrangement and abstracting air therefrom, said bleed ducting delivering abstracted air externally of the engine,
(i) a valve in said bleed ducting varying the rate of abstraction of air through the bleed ducting.

(j) means varying the air flow in said by-pass duct comprising valving at the downstream end of the by-pass duct, said valving being coupled for operation to the valve in the bleed ducting in the sense that, as the valve in the bleed ducting is opened, the valving is closed so that the outlet area of the by-pass duct is decreased, said means maintaining the pressure of the compressed air received by the high-pressure compressor on variation of the flow of abstracted air in said bleed ductings, whereby said high-pressure compressor is unchoked at its maximum rotational speed and at maximum rate of abstraction of air through said bleed ducting, said valving including a bullet member positioned centrally of and adjustable axially of said annular outer wall to vary the outlet area of the nozzle.

7. A by-pass gas turbine engine comprising
(a) a low-pressure air compressor,
(b) a high-pressure air compressor receiving compressed air from the low-pressure compressor,
(c) combustion equipment in which compressed air from the high-pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressors to receive air compressed in the low-pressure compressor,
(g) an exhaust nozzle assembly, said low-pressure turbine and said by-pass duct delivering to said exhaust nozzle assembly,
(h) bleed ducting connected to said flow series arrangement and abstracting air therefrom, said bleed ducting delivering abstracted air externally of the engine,
(i) a valve in said bleed ducting varying the rate of abstraction of air through the bleed ducting,
(j) means varying the air flow in said by-pass air duct and maintaining the pressure of the compressed air received by the high-pressure compressor on variation of the flow of abstracted air in said bleed ducting, whereby said high-pressure compressor is unchoked at its maximum rotational speed and at maximum rate of abstraction of air through said bleed ducting,
(k) a convergent intake duct leading into the high-pressure compressor, comprising an annular wall member, said annular wall member decreasing in area towards the high-pressure compressor.

8. A by-pass turbine engine comprising
(a) a low-pressure air compressor,
(b) a high-pressure air compressor, receiving compressed air from the low-pressure compressor,
(c) combustion equipment in which compressed air from the high-pressure compressor is heated,
(d) a high-pressure turbine,
(e) a low-pressure turbine, said compressors, said combustion equipment and said turbines being connected in flow series arrangement, said low-pressure turbine driving the low-pressure compressor and said high-pressure turbine driving said high-pressure compressor,
(f) a by-pass air duct having an inlet thereto connected to said flow series arrangement between said compressors,
(g) an exhaust nozzle assembly, said low-pressure turbine and said by-pass duct delivering to said exhaust nozzle assembly,
(h) bleed ducting connected to said flow series arrangement and abstracting air therefrom, said bleed ducting delivering abstracted air externally of the engine,
(i) a valve in said bleed ducting varying the rate of abstraction of air through the bleed ducting,
(j) means varying the air flow in said by-pass air duct and maintaining the pressure of the compressed air received by the high-pressure compressor on variation of the flow of abstracted air in said bleed ducting, whereby said high-pressure compressor is unchoked at maximum rotational speed and at maximum rate of abstraction of air through said bleed ducting,
(k) variable pitch stator blades in the earlier stages of the blading of said high-pressure compressor, and
(l) speed-responsive means connected to these stator blades to vary their pitch, said speed-responsive means being responsive to engine speed and being rendered operative on opening of the valve in the bleed ducting.

9. An aircraft having blown flaps and a power plant including a by-pass engine according to claim 1, said blown flaps being connected to said bleed ducting to be operated by air abstracted through said bleed ducting.

References Cited in the file of this patent
UNITED STATES PATENTS

| | | |
|---|---|---|
| 2,464,724 | Sedille | Mar. 15, 1949 |
| 2,551,229 | Alford et al. | May 1, 1951 |
| 2,672,726 | Wolf et al. | Mar. 23, 1954 |
| 2,873,576 | Lombard | Feb. 17, 1959 |
| 3,020,008 | Rumsey | Feb. 6, 1962 |

FOREIGN PATENTS

| | | |
|---|---|---|
| 704,669 | Great Britain | Feb. 24, 1954 |
| 1,218,064 | France | Dec. 14, 1959 |